(No Model.) 2 Sheets—Sheet 1.

O. O. OZIAS.
COMPUTING SCALE.

No. 581,172. Patented Apr. 20, 1897.

Witnesses:
J. M. Fowler
Thomas Durant

Inventor:
Orange O. Ozias,
by Church & Church
his Attorneys.

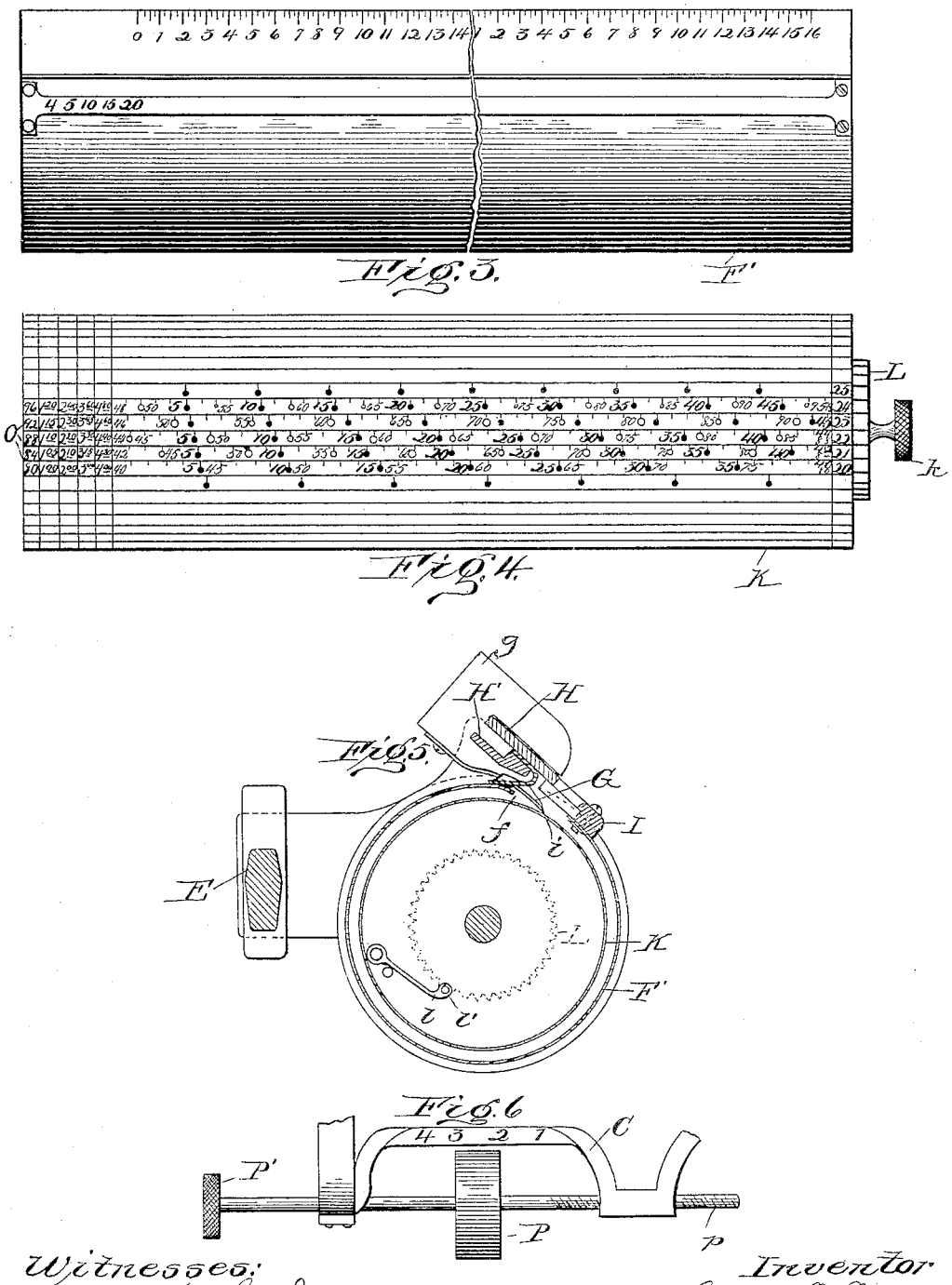

UNITED STATES PATENT OFFICE.

ORANGE O. OZIAS, OF DAYTON, OHIO.

COMPUTING-SCALE.

SPECIFICATION forming part of Letters Patent No. 581,172, dated April 20, 1897.

Application filed March 13, 1896. Serial No. 583,074. (No model.)

*To all whom it may concern:*

Be it known that I, ORANGE OSCAR OZIAS, of Dayton, county of Montgomery, State of Ohio, have invented certain new and useful Improvements in Scales; and I do hereby declare the following to be a full, clear, and exact description of the same, reference being had to the accompanying drawings, forming a part of the specification, and to the letters of reference marked thereon.

This invention relates to improvements in computing-scales, and particularly to that class of scales known as "even-balance" scales—that is to say, scales in which an equal portion of the weight is borne on each side of the fulcrum of the pivotal frame or beam proper.

The invention has for its object to provide a means for enabling the price of articles to be determined with such a scale by means of a set of computations with which the poise or indicator sliding from one side to the other of the fulcrum is adapted to register.

With scales of this character employing the graduated beam or bar to indicate weight it is necessary to make use of a relatively large and heavy poise for coöperation with said graduated beam. For example, said poise must be sufficiently large and heavy when at the extreme of the graduated beam or bar opposite to that end of the scale on which the article to be weighed is placed to exactly counterbalance the article or weight, which is within the extreme capacity of the scale. To illustrate, if the capacity of the scale is two pounds it is necessary to employ a sliding poise or its equivalent which weighs two pounds.

The invention consists, broadly, in combining an even-balance scale with a vertically-adjustable table of computations with which the sliding poise or its equivalent registers to indicate the value of any article within the capacity of the scale.

The invention further consists in providing a scale with a movable or rotary table of computations within an outer inclosing casing and a sliding poise for registering with said indications having its pointer or indicator projecting within said casing and an automatically-closing slot or aperture through which said pointer projects, whereby the entrance of dust or dirt is prevented.

The invention further consists in certain novel details of construction and combinations and arrangements of parts, all as will be now described, and pointed out particularly in the appended claims.

Figure 1:
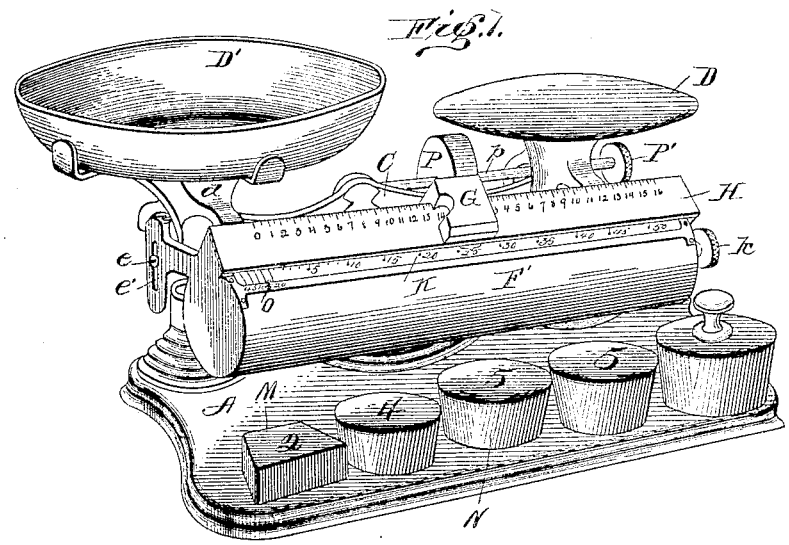
Figure 2:
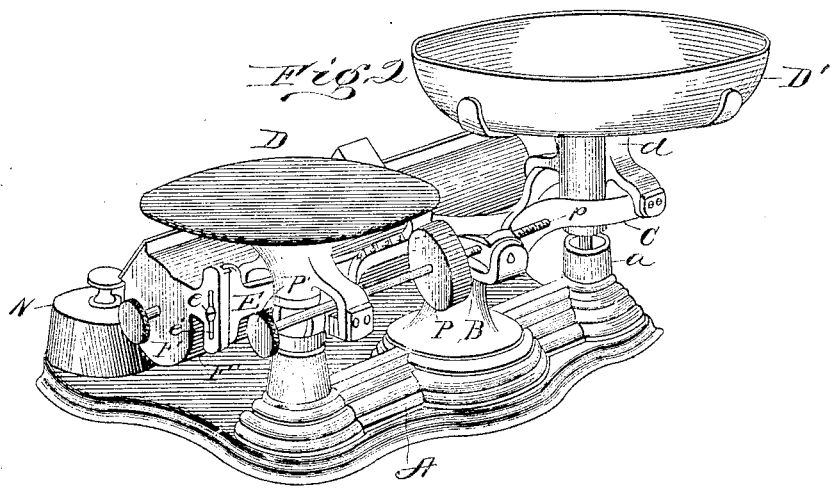

Referring to the accompanying drawings, Figure 1 is a perspective view of a scale constructed in accordance with my present invention. Fig. 2 is a similar view looking at the rear side of the scale. Fig. 3 is a detailed front elevation, on an enlarged scale, of the graduated beam or bar and of the casing in which the rotary member carrying the table of computations is located. Fig. 4 is a similar view of the cylinder removed from its casing. Fig. 5 is a transverse section through the casing, showing the sliding poise in side elevation and the internal construction of one of the casing-heads with its ratchet for holding the rotary member in its adjusted position with the desired set of computations at the sight-opening in the casing. Fig. 6 is a detail top plan view of the tare attachment for enabling tare to be compensated for in this class of scales.

Like letters of reference in the several figures indicate the same parts.

The scales which I have illustrated in connection with my present improvements is of the ordinary even-balance type, the letter A indicating a base having the usual central post or standard B, provided at the upper end with bearings for the knife-edge journals of the pivotal frame C. This frame C constitutes in effect the beam proper, and at its ends it is adapted to support the disks or pans or at one end to support a disk for the weights and at the opposite end a pan or scoop for the article to be weighed, all of which arrangements are well known and need not be further described by me. Suffice it to say D indicates the disk at one end for supporting the removable weights, and D' the removable pan or scoop at the opposite end, from both of which vertical standards *d* extend downward and are provided with V-shaped bearings somewhat widely separated for the accommodation of knife-edged journals on the ends of the pivotal frame or beam, and below this point the standards extend down through the end posts a and are connected to suitable levers or mechanism of the usual construction for maintaining the vertical position of the standards and at the same time allowing them to move freely up and down with the beam or pivotal member.

In the preferred construction, as illustrated in the accompanying drawings, the beam or pivotal member is provided with end extensions E, to which are adjustably connected the cap pieces or ends F of the casing F', within which the rotary member carrying the table of computations is located. These caps or end pieces F are further provided with seats on the upper side, in which the graduated bar or beam (which for convenience I will term the "graduated" bar herein) is held. These seats and the bar are preferably, as shown, inclined backward at quite a sharp angle in order to facilitate the reading of the graduations thereof and, what is of greater importance, to enable me to provide the sliding poise with sufficient weight for a scale of reasonably large capacity and at the same time not obscure the table of computations with which the poise registers to indicate the value of the articles being weighed.

In the preferred construction the sight-opening in the casing, through which the graduations on the table of computations are read, is located immediately in front of and below the graduated bar, and while the poise might be provided with a mark or other means for pointing out the graduation with which it registers in the table of computations located on the outside of the said opening in the preferred construction the sight-opening is entirely closed by a glass or other transparent closure, and the pointer connected to and moving with the sliding poise is brought in close to the rotary member carrying the table of computations by slotting the casing behind and beneath the graduated bar, as shown at f, and extending the pointer or indicator G in through the slot into position to be seen through the sight-opening in front of and below the graduated bar. Such construction in a large measure prevents the entry of dust into the casing, and consequently the rotary member carrying the table of computations is protected, but in order to further protect it and to absolutely exclude all dirt and dust the slot or opening is kept normally closed by means of a movable curtain or gate i, which in the preferred construction is formed by a longitudinal strip of flexible material, such as rubber, held in place to cover said slot by the casing or by the graduated bar, as will be presently explained. The poise may be of any ordinary construction and may, if desired, slide directly on the graduated bar; but I prefer the construction wherein the sliding poise is employed, which sliding poise is supported and slides on a supplemental bar or track located immediately behind the graduated bar, whereby it is held out of contact with the face of the graduated bar, and consequently the surface or face of the latter is not marred or worn by the sliding of the poise over the same, thus preserving the finish and preventing the wearing away or obliteration of the graduations thereon.

Referring now particularly to Fig. 5, it will be seen that the graduated bar H is provided on the rear and under side with a supplemental bar, or, more properly, a track H', preferably of hardened material, such as steel, and the sliding poise G is provided with double slots, one of which accommodates the graduated bar proper and the other of which accommodates the track, and the parts are so proportioned as that the poise is supported above the front surface or face of the graduated bar, its weight being practically supported by the track. For convenience in supporting the flexible gate or curtain i it may be clamped between the graduated bar and track, and to support the glass or transparent closure for the sight-opening I provide a frame I, which clamps the glass in place along the lower edge and supports its upper edge against the under side of the lower edge of the graduated bar, the edge of the glass thus forming one side of the slot through which the pointer G projects and saves the necessity of forming but one opening in the casing, as will be readily seen from Fig. 5.

The rotary member carrying the sets of computations for indicating the value of articles weighed on the scale in its preferred form is cylindrical in cross-section, as indicated by the dotted lines K, Fig. 5, being supported in the casing by journals entering bearings in the ends of the casing, and is adapted to be rotated by means of a knob or hand-piece k at one end, so as to bring any one of the sets of computations into view at the sight-opening, said tables of computations being of a character which will be presently explained.

To hold the cylinder in its adjusted position, and, further, to indicate when it is in proper position for any one of the sets of computations to be read through the sight-opening, I provide the cylinder with a toothed wheel L at one end, and on one of the casing-heads or cap-pieces I provide a spring-pressed or spring pawl l, having an antifriction-roller l' in its end, adapted to take in the teeth or serrations of the wheel L with sufficient force to hold the cylinder in its adjusted position but at the same time to allow said cylinder to be readily rotated by the application of force to the hand-piece or knob at the end.

The table of computations on the rotary member consists, first, of sets of graduations which indicate the value of articles at different rates per pound when balanced by the poise sliding on the graduated bar, and, secondly, of sets of computations which indicate the cost of articles balanced by the sliding poise plus the removable weight or counterpoise, said double sets of graduations being preferably determined in accordance with the invention shown and described in the patent to Kepler, No. 514,475, dated February 13, 1894, only that I prefer to arrange the second set of computations for indicating the value of articles balanced by the sliding poise plus the removable weight or counterpoise in line with the computations indicating the value of articles balanced by the sliding poise alone and to print the computations in different colors for convenience in distinguishing which set to read.

In order to eliminate all chance of the wrong weight being placed on the disk to balance the articles, cost of which can be determined from the second set of computations, I make said weight of a distinctive form and mark it in colors, so that it would not be possible for one to use another weight by mistake. As shown in Fig. 1, for instance, this weight, which is lettered M, is of a "keystone" form and weighs two pounds. Thus with the scale having its bar graduated, as shown, and with the two-pound sliding poise the capacity of the scale for computing directly is just doubled—that is to say, the sliding poise will balance two pounds and the distinctive weight will balance two pounds, enabling four pounds or any fraction thereof to be computed at any of the rates indicated on the cylinder.

To further increase the capacity of the scale and make it in all respects, so far as capacity is concerned, like an ordinary even-balance scale, I provide an additional set of counterweights, (lettered N, Fig. 1,) preferably of regular weight, as five, ten, fifteen, or twenty pounds, or capable of counterbalancing this amount by the use of one, two, or more of them, and in order to compute with the greatest facility the cost of articles so counterbalanced I provide on the rotary member at one end sets of computations (lettered O) which indicate the value of articles exactly balanced by each one of the supplemental weights or each combination of the supplemental weights desired at each rate per pound. These latter sets of computations, being mounted on a cylinder or rotary member, are brought into view beneath the sight-opening, and in order to determine which of the columns is to be read in connection with any particular supplemental weight I mark on the casing opposite to the columns of computations, so as to be in line with any of the computations in each column, suitable figures which indicate the weight corresponding to the value in that column at the particular price per pound appearing through the opening. For example, in the structure shown the figures "4," "5," "10," "15," and "20," marked on the casing adjacent to the sight-opening at the left-hand end and lying opposite to the columns of supplemental weight-computations on the rotary member, indicate the weights of articles the value of which is computed in the respective columns. With such an arrangement, therefore, when additional weights are employed the user first turns to this third set of computations and from the figures on the casing determines which column corresponds to the supplemental weights employed and, reading the figure at the sight-opening opposite this number, sees the value at that portion of the article balanced by the supplemental weights, and if the sliding poise has also been used to balance the article this amount is added to the value indicated by the pointer on the sliding poise in the first set of computations.

In even-balance scales it is highly desirable that some means should be provided for determining tare, and in my present structure I provide a means for accomplishing this end and at the same time overcome all difficulties incident to the employment of a secondary beam and enable the ordinary graduated bar or beam to be employed in weighing the article. To accomplish this result, I provide a relatively heavy tare-weight, which I preferably, though not necessarily, locate on the side of the pivotal member opposite to the side on which the casing and computing member is located, thus in a measure counterbalancing the weight of said computing member and distributing the strains more evenly on the knife-edge bearings. In the preferred construction this tare-weight P is mounted on or forms a part of a screw $p$ of preferably relatively sharp pitch supported by the frame of the pivotal member and adapted to be rotated by the knob or handle P' at one end.

Graduations may be formed on the periphery of the weight or on the frame itself and in position to register with the knife-edge of the weight or other indicator thereon, as shown in Fig. 2.

The knob or handle, it will be observed, extends out to the end of the pivotal member in convenient position to be grasped, and, what is of greater importance, the weight itself, while employed to allow for the determining of tare for anything within the capacity of the scale, is nevertheless so located as to be entirely out of the way and in no way detracts from the usefulness of the scales or hinders its operation.

As a convenient means for sealing the scale or setting it to make it sensitive to the proper degree "gravity" is adjusted by adjusting the casing carrying the computing member vertically. This I accomplish by forming vertical ways on the extensions E and fastening the caps F in place in these ways by means of screws $e$ passing through slots $e'$ into the extensions.

Having thus described my invention, what I claim as new, and desire to secure by Letters Patent, is—

1. In an even-balance scale the combination with the centrally-pivoted beam or frame and the receiver for the goods to be weighed and disk for the removable weights pivotally supported on the opposite ends of said pivoted beam or frame, of the vertically-adjustable price-computing member connected with said pivoted beam or frame and a movable poise for registering with the computations on said member for determining the value of articles weighed on the scales; substantially as described.

2. In a scales the combination with the centrally-pivoted beam or frame and the receiver for the goods to be weighed and disk for the removable weights pivotally supported on opposite ends of said pivoted beam or frame, of the vertically-adjustable rotary price-computing member mounted on said frame and extending on opposite sides of its pivotal center; substantially as described.

3. In a scales the combination with the pivoted member, receiver for the goods and weights, of the vertical guides on the beam, the price-computing member adjustably supported on said guides and a movable poise for registering with the computations on the price-computing member; substantially as described.

4. In a computing-scale the combination with the rotary member having tables of computations thereon, of a casing inclosing said rotary member having a sight-opening for exposing the tables of computations to view and a poise having an indicator for registering with said computations projecting within the casing; substantially as described.

5. In a computing-scale the combination with the cylindrical rotary member having tables of computations thereon, of the cylindrical casing inclosing said rotary member and having a sight-opening for exposing the tables of computations to view and a longitudinal slot or opening, of a poise having an indicator projecting into the casing through said slot or opening and registering with the computations on the rotary member beneath the sight-opening; substantially as described.

6. In a computing-scale the combination with the rotary member having tables of computations thereon, of the cylindrical casing inclosing said rotary member, a poise having an indicator for registering with the computations on the rotary member projecting within the casing and a flexible gate for closing the opening in the casing through which the indicator projects whereby the entry of dirt is prevented; substantially as described.

7. In a computing-scale the combination with the rotary member having tables of computations thereon and the cylindrical casing inclosing said rotary member having a sight-opening and a longitudinal slot or opening at one side of the sight-opening, of a poise having an indicator projecting within the casing through said longitudinal opening and a flexible curtain or gate for closing said opening, whereby the entry of dirt is prevented; substantially as described.

8. In a computing-scale the combination with the rotary member having tables of computations thereon and a graduated bar or beam mounted in an inclined position, of the cylindrical casing having a sight-opening at the lower edge of said bar or beam and the longitudinal slot or opening behind and beneath said beam whereby the entry of dirt into said opening is prevented and a poise moving over said bar or beam and having an indicator projecting through said longitudinal slot or opening for registering with the tables of computations; substantially as described.

9. In a scales the combination with the bar or beam mounted in an inclined position, of a track or guideway mounted in fixed position with relation thereto on the rear side, of a poise supported on said track and registering with the graduations on the front side of the inclined bar or beam, whereby the poise is prevented from wearing the surface of the bar or beam; substantially as described.

10. In a scales the combination with the inclined bar or beam graduated on its front and upper surface and a track or guideway extending longitudinally and mounted in fixed relation to said bar or beam, of the sliding poise working on said track or guideway and overlying the front of the graduated inclined bar or beam but supported out of contact with the surface thereof whereby the wearing or mutilation of the graduations is prevented; substantially as described.

11. In a computing-scale the combination with the beam, sliding poise and removable weights of a rotary member having tables of computations of value thereon of articles balanced by the sliding poise at different rates per unit and at one end columns of computations of values of articles exactly balanced by the removable weights at corresponding rates per unit and figures marked on the member mounted in fixed relation to the rotary member corresponding to the removable weight or weights and indicating which column of figures is to be read in connection with the different removable weights; substantially as described.

12. In a computing-scale the combination with the beam, sliding poise, removable weights and rotary member having tables of computations thereon with which the sliding poise registers to indicate the cost of articles balanced by the sliding poise and having also columns of figures at one end indicating the value of articles exactly balanced by the removable weights, of a casing inclosing said rotary member and having a sight-opening through which the tables of computations and columns of figures are exposed to view and figures in fixed relation to and opposite said columns of figures on the rotary member corresponding to the removable weight or weights and indicating which column of figures is to be read in connection with the removable weights; substantially as described.

13. In a scales, the combination with a frame pivotally supported on separate bearings at a point intermediate its ends to swing in a vertical plane coincident with its greatest length, and receivers for the goods and removable weights, supported on opposite ends of said frame, of a graduated bar mounted on and extending longitudinally of the frame in proximity to the front pivotal bearing, with a sliding weight on said bar, and a tare weight mounted on said frame in proximity to the rear pivotal bearing, said bar and its weight and the tare weight being located on opposite sides of a vertical plane taken longitudinally of the pivotal frame at a point midway between the pivotal bearings; substantially as described.

O. O. OZIAS.

Witnesses:
   ALEX. S. STEUART,
   CHARLES W. JAMES.